United States Patent
Liu et al.

(10) Patent No.: US 8,702,400 B2
(45) Date of Patent: Apr. 22, 2014

(54) SURFACE MOTOR DIRECT-DRIVE SUCKER-ROD SCREW PUMP DEVICE

(75) Inventors: Jun Liu, Dongyang (CN); Songbo Gou, Dongyang (CN); Yongjian Tang, Dongyang (CN); Hengli Cong, Dongyang (CN)

(73) Assignee: Millennium Oilflow Systems & Technology Inc., Edmonton, Alberta (CA)

( * ) Notice: Subject to any disclaimer, the term of this patent is extended or adjusted under 35 U.S.C. 154(b) by 1094 days.

(21) Appl. No.: 12/375,951

(22) PCT Filed: Aug. 4, 2006

(86) PCT No.: PCT/CN2006/001967
§ 371 (c)(1),
(2), (4) Date: Dec. 21, 2009

(87) PCT Pub. No.: WO2008/017211
PCT Pub. Date: Feb. 14, 2008

(65) Prior Publication Data
US 2010/0098563 A1    Apr. 22, 2010

(51) Int. Cl.
*F16H 3/06* (2006.01)
*F16H 27/02* (2006.01)
*F16H 29/02* (2006.01)
*F16H 29/20* (2006.01)

(52) U.S. Cl.
USPC ..... 417/415; 74/89.23; 74/89.34; 318/400.38

(58) Field of Classification Search
USPC ............. 417/415; 318/400.1, 400.37–400.39; 74/57, 59, 89.23, 89.28, 89.34
See application file for complete search history.

(56) References Cited

U.S. PATENT DOCUMENTS

| | | | | | |
|---|---|---|---|---|---|
| 2,245,457 | A | * | 6/1941 | Brassell | 74/57 |
| 2,280,261 | A | * | 4/1942 | Pounds | 74/57 |
| 2,891,408 | A | * | 6/1959 | Burt, Jr. | 74/59 |
| 2,913,910 | A | * | 11/1959 | Gillum | 74/57 |
| 3,065,704 | A | * | 11/1962 | Hill | 417/13 |
| 4,603,283 | A | | 7/1986 | Oltendorf | |
| 5,404,767 | A | * | 4/1995 | Sutherland | 74/89.28 |
| 5,712,540 | A | * | 1/1998 | Toda et al. | 318/46 |
| 5,844,397 | A | | 12/1998 | Konecny et al. | |

(Continued)

FOREIGN PATENT DOCUMENTS

| | | |
|---|---|---|
| CA | 2272269 A1 | 9/2000 |
| CN | 2125736(U) | 12/1992 |

(Continued)

OTHER PUBLICATIONS

Examiner's Report dated Jul. 24, 2012, CA2006347192.

*Primary Examiner* — Peter J Bertheaud
(74) *Attorney, Agent, or Firm* — Kilpatrick Townsend & Stockton LLP

(57) ABSTRACT

A surface motor direct-drive sucker-rod screw pump device is driven by a vertical three-phase permanent magnet brush-less DC motor, and comprises a motor controller (6), a rectifying circuit, an inversion circuit, a CPU and a driving circuit. The motor controller (6) is used to adjust the voltage and frequency of the motor by the rectifying circuit, the inversion circuit, the CPU and the driving circuit. Thus, the speed of the motor can vary from zero to the maximum. The device is easy to operate and has a higher efficiency.

5 Claims, 3 Drawing Sheets

(56) References Cited

U.S. PATENT DOCUMENTS

| | | | |
|---|---|---|---|
| 5,945,802 A | 8/1999 | Konrad et al. | |
| 6,512,341 B2 * | 1/2003 | Matsushiro et al. | 318/400.07 |
| 7,102,306 B2 * | 9/2006 | Hamaoka et al. | 318/400.01 |
| 7,330,011 B2 * | 2/2008 | Ueda et al. | 318/807 |
| 7,427,841 B2 * | 9/2008 | Hamaoka et al. | 318/400.01 |
| 2006/0275161 A1 * | 12/2006 | St. Denis | 417/415 |
| 2009/0108785 A1 * | 4/2009 | Takada | 318/400.38 |

FOREIGN PATENT DOCUMENTS

| | | |
|---|---|---|
| CN | 2588658(Y) | 11/2003 |
| CN | 2681438(Y) | 2/2005 |
| CN | 1683791(A) | 10/2005 |
| CN | 2737066(Y) | 10/2005 |
| JP | 2005328583(A) | 11/2005 |

\* cited by examiner

SURFACE MOTOR DIRECT-DRIVE SUCKER-ROD SCREW PUMP DEVICE

TECHNICAL FIELD

The present invention pertains to a ground oil extracting apparatus, in particular, to a motor direct drive rod ground screw pump device.

BACKGROUND OF THE INVENTION

The present oil extracting rod ground screw pump driving system employs common asynchronous motor through belt transmission to drive gear box, and the gear box then drives the polished rod of the screw pump to make rotary motion. The dynamic system for such a screw pump has the following disadvantages:

1. The transmitted power is limited. When the screw pump requires bigger torque (for example, a torque greater than 1500 Nm) or the system transmitted power is larger (for example, greater than 10 kW), the belt may easily slip and be damaged, the teeth of the gear box are easily broken and damaged, making it difficult to satisfy the requirement.

2. A large amount of mechanical maintenance and high operation cost are needed. Rotary sealing parts must be installed within the gear box because there is lubricating oil in the gear box. In practical operation, problems with lubricating oil leakage occur in the gear box. Moreover, the reliability of the belt transmission is poor, which leads to a large amount of mechanical maintenance and high operation cost during practical operation.

3. The efficiency is low. In general, for the convenience of starting, the equipped motor is always chosen to have 3 times the power as that of the practical operation power, which leads to the operation of the asynchronous motor at a low load rate, thus the efficiency is rather low and is generally about 75%.

4. The regulation of parameter is not convenient. When the speed needs to be re-regulated if the downhole working conditions vary, generally, the belt pulley must be changed or a variable pole adjustable speed motor must be employed. Changing the belt pulley is very troublesome, while just one to two gears can be used through the speed adjustment of the variable pole adjustable speed motor, which makes it inconvenient in practical usage.

5. The noise is great. The noise during the operation of mechanical speed reducing devices and high speed asynchronous motor is great and thus it is not suitable to installed in residential districts.

6. The occupied area for the equipment is large. Since the belt pulley system requires a large occupied area, the equipment is not suitable for situations that require a small area, such as an offshore oil-production platform, cluster well, etc.

A low speed motor direct drive screw pump device has been provided in Chinese patent publication no. CN 1683791 entitled "Directly driving screw pump device". The device consists of polished rod, a shaft coupling, a low speed motor, a motor controller, a fixing seat, and a screw pump. The motor shaft of the low speed motor is hollow and positioned within the polished rod. The motor shaft is fixed with to the polished rod using a shaft coupling. The polished rod passes through the central hole of the fixed seat and connects to the shaft of screw pump downhole. The low speed motor is fixed onto the fixed seat. The motor controller is installed within the terminal box of the low speed motor, and a matching controller for the low speed motor is employed. Such a motor directly driving a screw pump does not use a belt transmission or a speed change gear device. As motor shaft is connected to the pump shaft of screw pump through polished rod, the reactive power loss is decreased, the system efficiency and reliability of screw pump is increased, the oil extracting cost is reduced, and at the same time, the volume and weight of the screw pump is reduced.

However, the device does not allow precise regulation of any value of motor speed from zero to maximum by the controller, and the device has the disadvantage of difficult speed regulation, and the efficiency of the system must be increased.

SUMMARY OF THE INVENTION

The purpose of the invention is to provide an efficient rod ground screw pump direct drive screw pump, in which the motor speed of the direct drive screw pump can be precisely chosen between zero to maximum and the operation is convenient.

There is provided a motor direct drive rod ground screw pump device comprising a polished rod 1, a polished rod clip 2, a motor 4, a motor controller 7, a flange oil outlet 6, an oil well flange 8, and a screw pump body 9. The motor is a vertical three phase permanent magnet brushless direct current motor with a hollow shaft, the polished rod passing through the hollow shaft; the motor controller comprises a rectification circuit for rectifying the alternating current into direct current; a converter circuit for transforming the direct current into adjustable alternating current; a CPU for modulating the motor sensorless DSP direct current brushless sine wave; and a driving circuit for isolating the signal and magnifying the power as well as acting as a converter circuit and adjusting the voltage of permanent magnet motor thus realizing poleless speed adjustment.

According to another aspect, the motor direct drive rod ground screw pump device may employ a vertical three phase permanent magnet brushless direct current motor with the motor controller matching it to precisely regulate the motor speed of the direct drive screw pump between zero and maximum. The device is easily controlled and the efficiency of the system is high.

According to another aspect, the motor controller may comprises a rectification circuit for rectifying the alternating current into direct current; a converter circuit for transforming the direct current into adjustable alternating current; a Hall sensor for detecting the rotary position of the rotor of vertical three phase permanent magnet brushless direct current motor; a CPU for modulating the direct current brushless sine wave of mono-chip microcomputer with Hall sensor; a driving circuit for isolating the signal and magnifying the power, as well as acting on converter circuit and realizing smoothly speed adjustment of the motor.

According to another aspect, the bottom of the vertical three phase permanent magnet brushless direct current motor may be installed with a thrust bearing with a dynamic load capacity of more than 10 tons.

According to another aspect, the vertical three phase permanent magnet brushless direct current motor may employ F level insulation, the security level of the shell may be IP54 and the temperature may rise on B-class assessment.

According to another aspect, the motor torque of the vertical three phase permanent magnet brushless direct current motor system may be 200-6000 Nm, and the rotary speed may be 0-1000 rpm/min.

According to another aspect, the rectification circuit may be a three phase semi-control bridge.

According to another aspect, the converter circuit may be a three phase full-bridge converting output employing an insulated gate bipolar transistor (IGBT).

According to another aspect, the rectification circuit may be a three phase semi-control bridge; the converter circuit may be a three phase full-bridge converting output employing an insulated gate bipolar transistor (IGBT), and the CPU may have inputs from the controller direct current bus voltage, the motor current and the temperature signal of module radiator.

According to another aspect, the range of the input for the current controller bus voltage may be 3×380V-3×690V, f=50/60 Hz.

According to another aspect, the current sampling signal between converter circuit and motor is may be transferred into the CPU.

According to another aspect, the CPU may have a communication interface and a human-machine operation panel.

According to another aspect, the CPU has a start-stop signal input port.

Advantages:

According to another aspect, the motor direct drive rod ground screw pump device may employ a vertical three phase permanent magnet brushless direct current torque explosion proof motor with the following characteristics: 1) the structure is vertical and the shaft is hollow, thus it's convenient for the pump rod to pass through, the bottom of the motor has a thrust bearing with a dynamic load capacity of greater than 10 tons, such that the motor can withstand the weight of the downhole whole screw pump body and polished rod which is less than 10 tons. The diameter of the polished rod is preferably less than 40 mm. 2) the rotor of the motor is a permanent magnet and employs the control manner of brushless direct current. The rotor has no excitation loss and has a rated efficiency of 94%, the efficiency can also be higher than 88% when ⅓ load rate is employed; the reactive loss absorbed by the system is very small. The operating efficiency of the asynchronous motor employed by traditional mechanical screw pump under ⅓ load rate is about 75%. Compared with an asynchronous motor, the efficiency of the direct drive permanent magnet direct current brushless motor has been increased by about 10% (including the 3% loss due to the transducer of 3%). 3) Explosion proof property. The direct drive motor is installed toward the top of an oil well and the motor requires explosion proof design according to safety regulations. The device can be safely operated in division 2 explosion hazardous places and employs F level insulation, the security level of the shell is IP54 and the temperature rises on B-class assessment. The requirement for operating reliability and motor temperature can be satisfied by choosing high quality raw materials and leaving a large margin for electrical and mechanical computations.

According to another aspect, the speed adjustable high-efficiency motor direct drive rod ground screw pump device may have a motor controller that is a brushless direct current (BLDC) sine wave. The speed of motor may be set by the controller at any speed between zero and maximum to synchronously drive the rotary operation of the polished rod, thus realizing the smooth precise speed adjustment of the polished rod.

Advantages:

According to an aspect, the motor direct drive rod ground screw pump device may employ a vertical three phase permanent magnet brushless direct current torque explosion proof motor with the following characteristics: 1) the structure is vertical and the shaft is hollow, thus it's convenient for the pump rod to pass through, the bottom of the motor has a thrust bearing with a dynamic load capacity of greater than 10 tons, such that the motor can withstand the weight of the downhole whole screw pump body and polished rod which is less than 10 tons. The diameter of the polished rod is preferably less than 40 mm. 2) the rotor of the motor is a permanent magnetic and employs the control manner of brushless direct current. The rotor has no excitation loss and has a rated efficiency of 94%, the efficiency can also be higher than 88% when ⅓ load rate is employed; the reactive loss absorbed by the system is very small. The operating efficiency of the asynchronous motor employed by traditional mechanical screw pump under ⅓ load rate is about 75%. Compared with an asynchronous motor, the efficiency of the direct drive permanent magnet direct current brushless motor has been increased by about 10% (including the 3% loss due to the transducer 3) Explosion proof property. The direct drive motor is installed toward the top of an oil well and the motor requires explosion proof design according to the requirement of safety regulations. The device can be safely operated in division 2 explosion hazardous places and employs F level insulation, the security level of the shell is IP54 and the temperature rises on B-class assessment. The requirement for operating reliability and motor temperature can be satisfied by choosing high quality raw materials and leaving a large margin for electrical and mechanical computations.

According to an aspect, the device causes the smooth speed adjustment using the special controller of the three phase permanent magnet brushless direct current torque explosion proof motor. The rotary speed can be continuously adjusted within the range of 0-500 rpm/min under a rated power voltage. The controller may be digital and the range of the input of power supply is: 3×380V-3×690V, f=50/60 Hz. The commutation controlling parts have two configurations: one is a simple configuration with a Hall sensor employing a monochip microcomputer controller, in particular a brushless direct current manner controlled by a sine wave. The characteristics of this configuration are that the control motor has a low noise and is able to satisfy large power requirements, as well as the operation is much better than the manner of square wave. Another configuration is sensor-less, which can be accomplished by using a high performance DSP chip. The advantages of this configuration are a simple connection and a higher reliability.

The controller has inputs of bus voltage, motor current and temperature of module radiator used to help with motor control and protection. The controller further has auxiliary heating, a start-stop I/O, communication interface and a human-machine interface. The operation is very simple.

Figure 1:
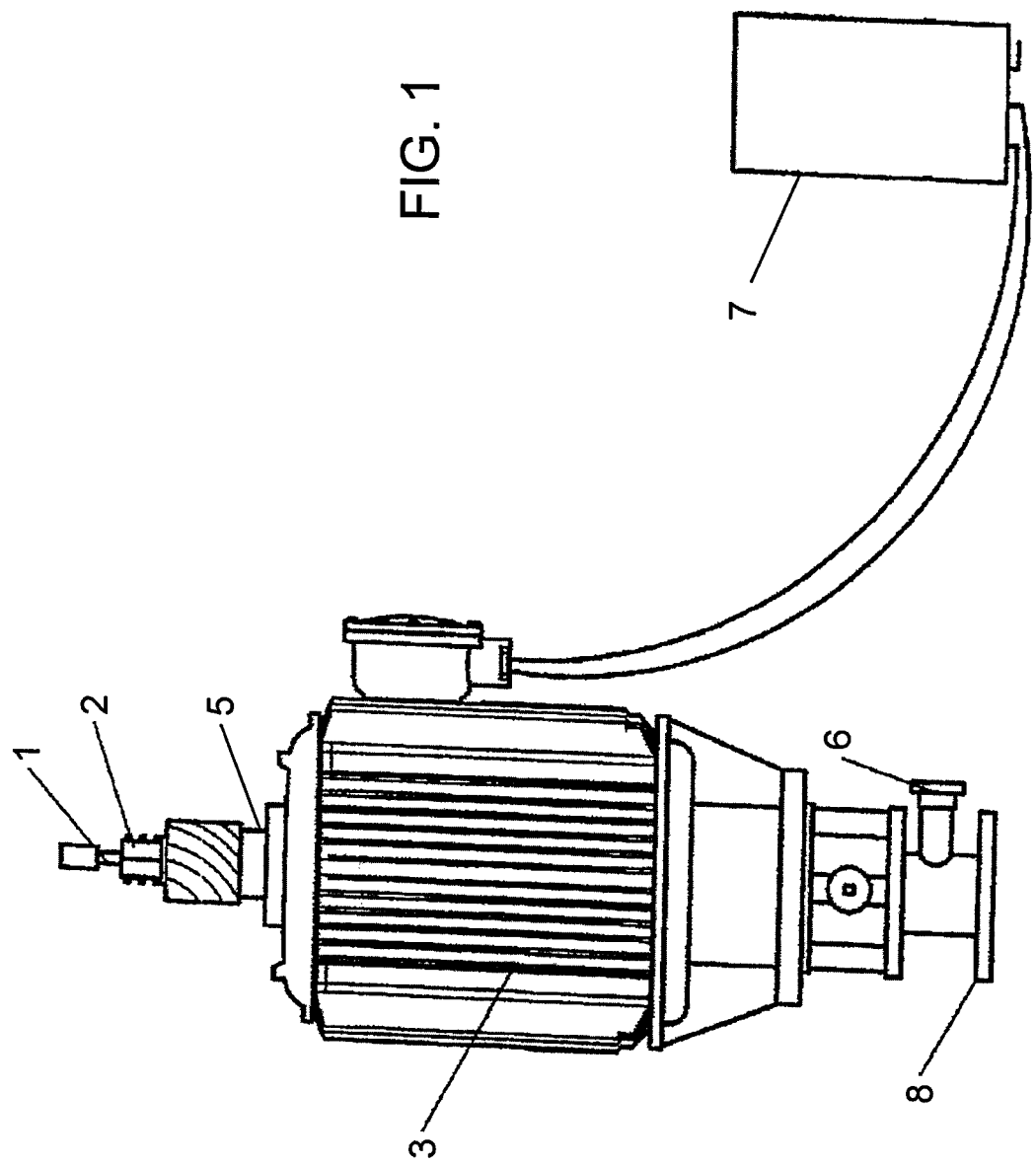
FIG. 1 is an installation diagram of a rod ground screw pump direct drive device, in which the following elements are present.
Figure 2:
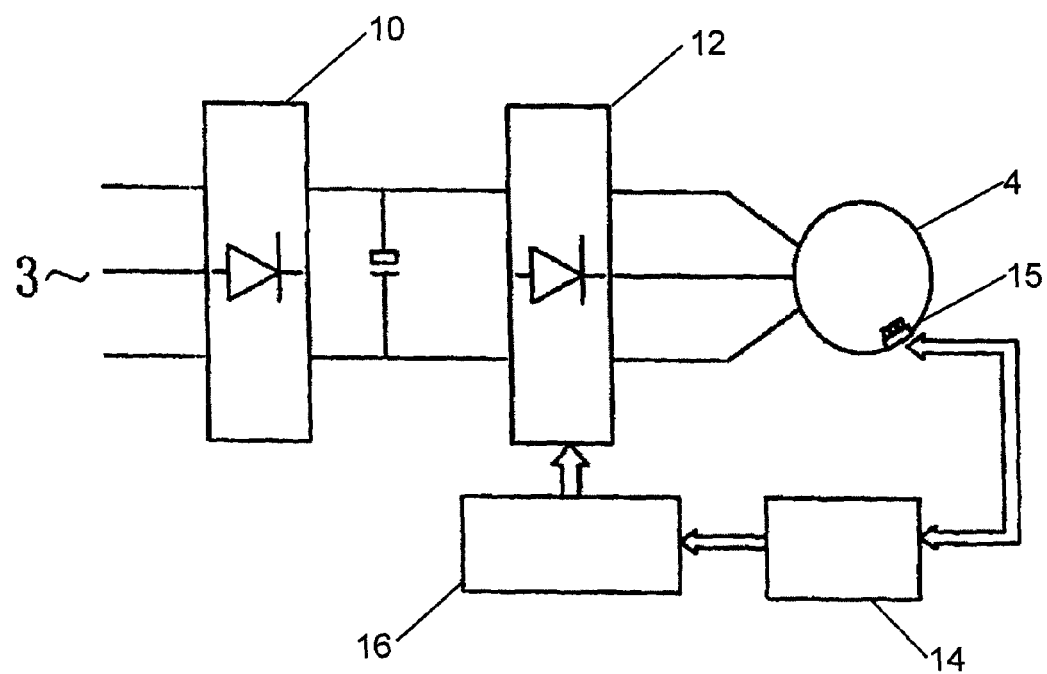
Figure 3:
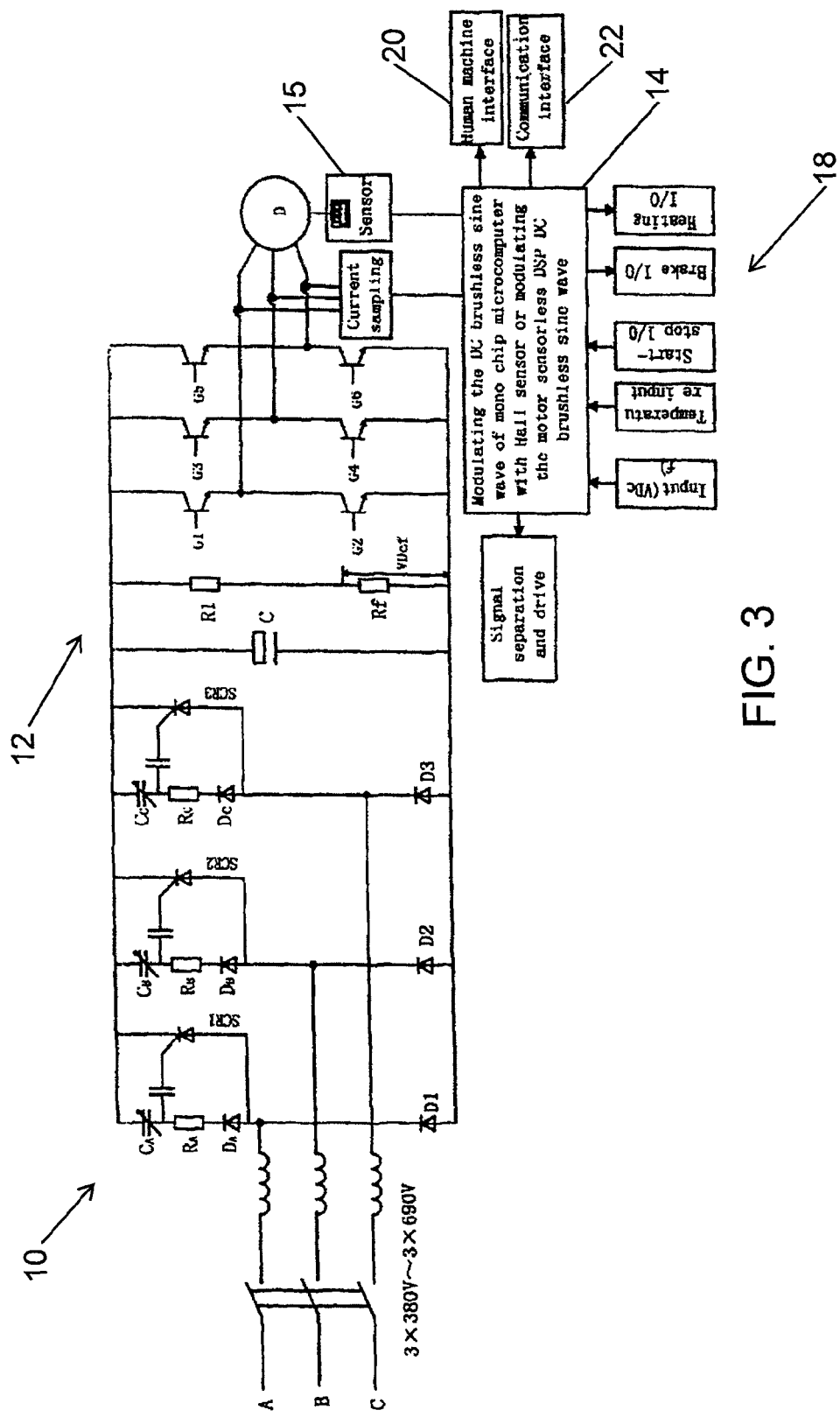

polished rod 1, polished clip 2, permanent magnet explosion proof brushless direct current motor 4, oil well flange 8, flange oil outlet 6, motor controller 7;

FIG. 2 is a block diagram of a controller circuit;

FIG. 3 is a schematic diagram of a controller.

DESCRIPTION OF THE PREFERRED EMBODIMENTS

Embodiment 1

The motor direct drive rod ground screw pump device comprises a polished rod 1, a polished rod clip 2, a motor 4, a motor controller 7, a flange oil outlet 6, an oil well flange 8, and a screw pump body 9. The motor 4 is a vertical three phase permanent magnet brushless direct current motor with a hollow shaft 5. The polished rod 1 passes through the hollow shaft 5. The motor 4 is attached with the hollow shaft 5 as one through the polished rod clip 2 and connects to the pump shaft of the downhole screw pump knot shown). The motor controller 7 comprises a rectification circuit 10 for rectifying the alternating current into direct current, a converter circuit, also referred to as a commutator circuit 12, for transforming the direct current into adjustable alternating current, a CPU 14 for modulating the sensorless DSP direct current brushless sine wave motor 4 and a driving circuit 16 for isolating the signal and magnifying the power, as well as acting on the commutation circuit 12 and adjusting the voltage of permanent magnet motor to achieve poleless speed adjustment.

Embodiment 2

Referring to FIG. 1, the motor direct drive rod ground screw pump device comprises a polished rod 1, a polished rod clip 2, a motor 4, a motor controller 7, a flange oil outlet 6, an oil well flange 8, and a screw pump body 9. The motor 4 is a vertical three phase permanent magnet brushless direct current motor with a hollow shaft 5, the polished rod passes through the hollow shaft 5. The motor 4 is fixed with the hollow shaft 5 as one through the polished rod clip 2 and connects to the pump shaft of the downhole screw pump (not shown). Referring to FIG. 2, the motor controller comprises a rectification circuit 10 for rectifying the alternating current into direct current; a converter circuit 12 for transforming the direct current into adjustable alternating current; a Hall sensor 15 for detecting the rotary position of the rotor of vertical three phase permanent magnet brushless direct current motor; a CPU 14 for modulating the direct current brushless sine wave of mono-chip microcomputer with Hall sensor; a driving circuit 16 for isolating the signal and magnifying the power, as well as acting on the commutation circuit 12 and realizing smooth speed adjustment of the motor.

Referring to FIG. 3, the motor controller has a three phase input at inputs A, B and C. The rectification circuit 10 is connected to each and is represented by respective capacitors C, resistors R and diodes D. The converter circuit 12 is represented by Resistors R1 and Rf as well as transistors G1-G6. The CPU 14 receives multiple inputs 18, such as current sampling from the output of the converter circuit 12, rotary position sensor 15, temperature, motor start-stop, brake, and heating. The CPU 14 is connected to a human machine interface 20 and a communication interface 22.

Embodiment 3

The motor direct drive rod ground screw pump device has the same structure as that of embodiment 1 with the exception that the rectification circuit is a three phase semi-control bridge, no charging limiting current contactor.

Embodiment 4

The motor direct drive rod ground screw pump device has the same structure as that of embodiment 2 with the exception that the commutation circuit is a three phase full-bridge commutation output employing insulate gate bipolar transistor IGBT.

Embodiment 5

The motor direct drive rod ground screw pump device has the same structure as that of embodiment 1 or 2 with the exception that the rectification circuit is a three phase semi-control bridge, no charging limiting current contactor. The commutation circuit is a three phase full-bridge commutation output employing insulate gate bipolar transistor IGBT. CPU has an inputs of controller direct current bus voltage, motor current and temperature signal of module radiator, and controller has a de-moisture space heat output.

Embodiment 6

The motor direct drive rod ground screw pump device has the same structure as that of embodiment 5 with the exception that the vertical three phase permanent magnet brushless direct current motor is installed with a thrust bearing with a dynamic load of 20 tons.

Embodiment 7

The motor direct drive rod ground screw pump device has the same structure as that of embodiment 5 with the exception that the vertical three phase permanent magnet brushless direct current motor is installed with a thrust bearing with a dynamic load of 30 tons.

Embodiment 8

The motor direct drive rod ground screw pump device has the same structure as that of embodiment 5 with the exception that the vertical three phase permanent magnet brushless direct current motor employs F level insulation, the security level of the shell is IP54 and the temperature rises on B-class assessment.

Embodiment 9

The motor direct drive rod ground screw pump device has the same structure as that of embodiment 5 with the exception that the motor torque of the vertical three phase permanent magnet brushless direct current motor system is 200-6000 N·m, rotary speed is 0-1000 rpm/min.

Embodiment 10

The motor direct drive rod ground screw pump device has the same structure as that of embodiment 5 with the exception that the current sampling signal between commutation circuit and motor is transferred into CPU.

Embodiment 11

The motor direct drive rod ground screw pump device has the same structure as that of embodiment 5 with the exception that the range of the input for the controller power supply is 3×380V-3×690V, f=50/60 Hz.

Embodiment 12

The motor direct drive rod ground screw pump device has the same structure as that of embodiment 5 with the exception that the CPU has a communication interface and a human-machine operation panel.

Embodiment 13

The motor direct drive rod ground screw pump device has the same structure as that of embodiment 5 with the exception that the CPU has a start-stop signal input port.

The invention claimed is:

1. A motor direct drive rod ground screw pump device, comprising:
    a polished rod, a polished rod clip, a motor, a motor controller, a flange oil outlet, an oil well flange, a screw pump body, wherein the motor is a vertical three phase permanent magnet brushless direct current motor with a hollow shaft, the polished rod passes through said hollow shaft;
    wherein the motor controller comprises:
    a rectification circuit for rectifying a three phase alternating current into direct current;
    a converter circuit for converting the direct current into alternating current which can be adjusted;
    a Hall position sensor for detecting the rotary position of a rotor of the vertical three phase permanent magnet brushless direct current motor;
    a CPU for modulating the direct current brushless sine wave of mono-chip microcomputer with Hall sensor;
    a driving circuit for isolating the signal and magnifying the power, as well as acting on the converter circuit and adjusting the voltage and frequency of the vertical three phase permanent magnet brushless direct current motor thus realizing continuous speed adjustment;
    wherein the rectification circuit is a three phase semi-control bridge, the converter circuit is a three phase full-bridge converter output employing an insulated gate bipolar transistor, and the CPU has inputs of controller direct current bus voltage, motor current and temperature signal of a module radiator.

2. The motor direct drive rod ground screw pump device according to claim 1, wherein the voltage of the three phase alternating current supplied to the motor controller is between 3×380V and 3×690V at a frequency of between 50 and 60 Hz.

3. The motor direct drive rod ground screw pump device according to claim 1, wherein a current sampling signal between the converter circuit and the motor is transferred into the CPU.

4. The motor direct drive rod ground screw pump device according to claim 1, wherein the CPU has a communication interface and a human-machine operation panel.

5. The motor direct drive rod ground screw pump device according to claim 1, wherein the CPU has a start-stop signal input port.

* * * * *